No. 631,530. Patented Aug. 22, 1899.
J. L. PARKER.
SELF CLOSING VALVE FOR PNEUMATIC HOISTING CYLINDERS.
(Application filed June 17, 1897.)

(No Model.)

WITNESSES:
George L. Parker
Joseph Wilcox

James L. Parker
INVENTOR.
BY
James A. Joyce
ATTORNEY.

United States Patent Office.

JAMES L. PARKER, OF CLEVELAND, OHIO.

SELF-CLOSING VALVE FOR PNEUMATIC HOISTING-CYLINDERS.

SPECIFICATION forming part of Letters Patent No. 631,530, dated August 22, 1899.

Application filed June 17, 1897. Serial No. 641,208. (No model.)

*To all whom it may concern:*

Be it known that I, JAMES L. PARKER, a citizen of the United States, residing at Cleveland, in the county of Cuyahoga and State of Ohio, having invented a new and useful Self-Closing Valve for Pneumatic Hoisting-Cylinders, of which the following is a specification.

My invention relates to improvements in valves for pneumatic hoisting-cylinders. The valve is so constructed as to be self-closing by releasing the cord or lever by which it is opened. I attain this by the mechanism illustrated in the accompanying drawings, in which—

Figure 1:
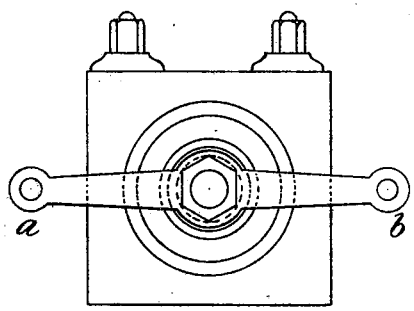
Figure 2:
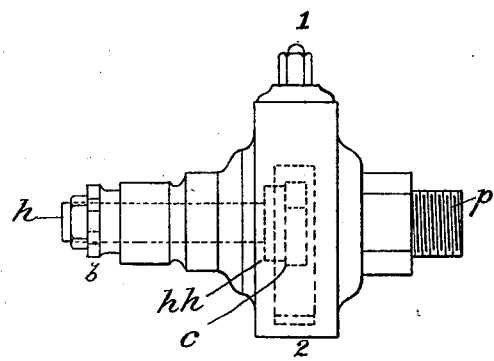
Figure 3:
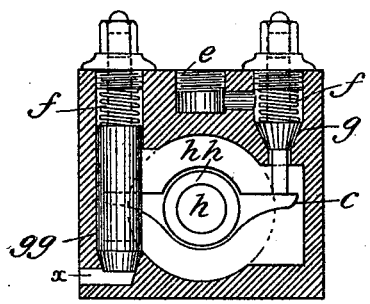
Figure 4:
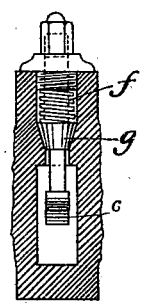
Figure 5:
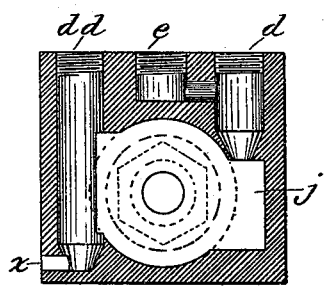
Figure 6:
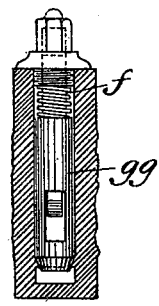

Figure 1 is a front elevation. Fig. 2 is an elevation of right side. Fig. 3 is a section on line 1 2, Fig. 2, looking from front to back. Fig. 4 is a section showing right-hand valve. Fig. 5 is a section on line 1 2, Fig. 2, showing casing with parts removed. Fig. 6 is a section showing left-hand valve.

Similar letters refer to similar parts throughout the several views.

The valve, briefly described, is as follows: The valve has casing (shown in Figs. 2 and 5) with two valve-chambers $d$ and $dd$ and having a recess in the side to receive the enlargement $hh$ at inner end of shaft $h$, valve-chamber $d$ communicating with inlet $e$ and valve-chamber $dd$ communicating with outlet $x$ and both valve-chambers $d$ and $dd$ communicating with pneumatic cylinder through chamber $j$ and the opening at $p$. In valve-chamber $d$ is placed a valve $g$, seated at lower end and having a spring $f$ for closing. This valve controls the flow of air from inlet $e$ to pneumatic cylinder through chamber $j$ and the opening at $p$. In valve-chamber $dd$ is placed a valve $gg$, which is slotted to receive one end of cross-arm $c$, seated at lower end and having a spring $f$ for closing. This valve controls the flow of air from pneumatic cylinder through the opening at $p$ and chamber $j$ to outlet $x$. The valves $g$ and $gg$ are independently movable and are raised by internal cross-arm $c$ and are made self-closing by springs $f$ forcing valves down on their seats. Cross-arm $c$ is fixed on shaft $h$, which is mounted in casing so as to project through said casing to receive an operating cross-arm $a\,b$ and having an enlarged end $hh$, fitting in a recess inside of said casing bearing against said casing, so that the pressure on inside forces the enlarged part of shaft $h$ against said casing, and thus preventing any leaking around said shaft $h$.

The valve may be fastened at $p$, Fig. 2, to an opening at the lower end of a pneumatic hoisting-cylinder, so the air-pressure will raise the piston-head, and thereby raise a load fastened to a hook at the lower extremity of the piston-rod. The air under pressure enters the valve at inlet $e$, Fig. 3. When arm $a$, Fig. 1, is pulled down, the valve $g$, Fig. 3, is raised by cross-arm $c$ and the air passes through valve-chamber $g$ to cylinder through chamber $j$. The air under pressure will flow into cylinder as long as the arm $a$ is held down, and when the load is hoisted to the desired height by simply releasing the arm $a$ the spring $f$ will close valve $g$ and stop the air from entering the cylinder, and thus stop the hoisting. The load on the piston-rod will keep the air under pressure in the cylinder and in the chamber $j$, Fig. 3. When the arm $b$, Fig. 1, is pulled down, the valve $gg$ is raised by cross-arm $c$, which will allow the air to escape through opening $x$, Fig. 3, which will cause the load on the piston-rod to be lowered, and by releasing the arm $b$, Fig. 1, the load may be stopped at any desired point, because when the arm $b$ is released the spring $f$, Fig. 3, will close valve $gg$ and prevent the air from passing out, thus causing the load to stop at any desired point.

While this valve is intended for air-hoists, it may be used for other purposes where automatic-closing valves may be required.

What I claim as new, and desire to secure by Letters Patent, is as follows:

In a valve the combination with a casing having two valve-chambers, one communicating with inlet $e$ and one communicating with outlet $x$, and both with chamber $j$; valve-seats located between the end of the inlet-valve chamber and chamber $j$, and between chamber $j$ and the outlet-passage $x$, of two freely and independently movable and disconnected spring-closing valves $g$ and $gg$ located within said valve-chambers $d$ and $dd$ with said valves inside of said casing and engaging with internal cross-arm $c$ fixed on shaft $h$ which is mounted in said casing so as to project through to receive an operating cross-arm $a\,b$ and having an enlarged end $hh$ inside of casing bearing against said casing so that the pressure on inside forces the enlarged part of shaft against said casing and preventing any leaking around said shaft $h$.

JAS. L. PARKER.

Witnesses:
WILLIAM MITCHELL,
JOSEPH WILCOX.